United States Patent Office 2,982,096
Patented May 2, 1961

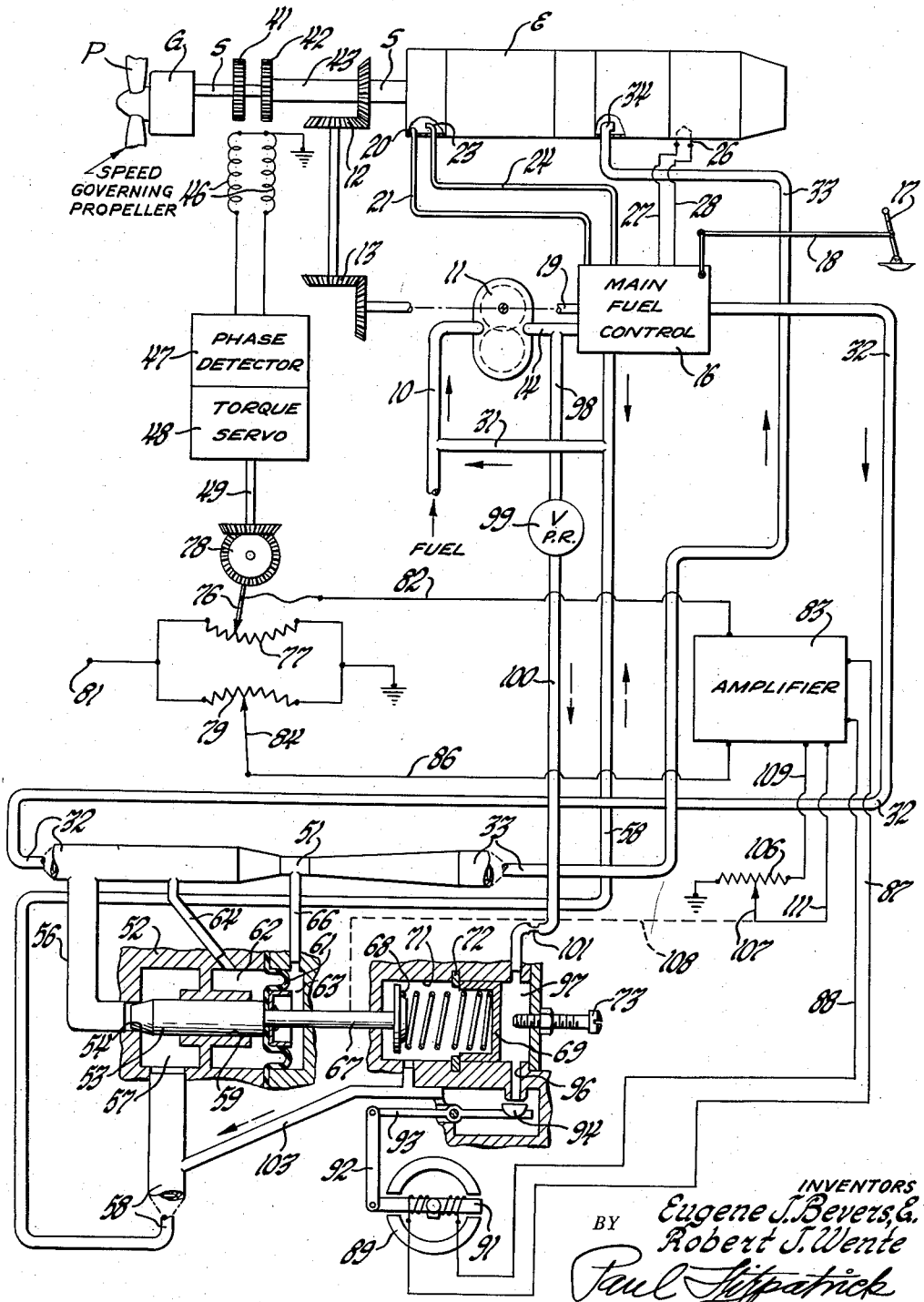

2,982,096
TORQUE LIMITER
Eugene J. Bevers and Robert J. Wente, Indianapolis, Ind., assignors to General Motors Corporation, Detroit, Mich., a corporation of Delaware
Filed May 28, 1957, Ser. No. 660,495
8 Claims. (Cl. 60—39.28)

Our invention relates to controls for gas turbine engines. It is particularly directed to a control for an engine such as an aircraft turboprop engine which serves to limit the power output of the engine to prevent mechanical overloading of the engine or reduction gear.

By way of background to the description of the invention, various modes of control for aircraft turbine propeller power plants are known. The mode of control which has proved most successful involves controlling the power output of the engine by regulating the amount of fuel supplied to it and controlling the speed of the engine by a speed-governing propeller. This sort of control is employed in normal takeoff, flight, and landing operation of the aircraft. The fuel controls which are used in such systems are of various types, but a preferred type is a control which responds to certain controlling conditions such as rotational speed of the engine, temperature of air entering the engine, and pressure of air entering the engine or leaving the compressor, and, from these controlling conditions, determines a rate of fuel flow to the engine which will maintain approximately a desired turbine inlet temperature. Such fuel controls frequently include means responsive to turbine inlet temperature for more exact control of this condition. In other words, the fuel supply under certain conditions is varied in direct response to turbine inlet temperature to maintain this temperature at a desired value or to prevent it from exceeding a safe limit.

Such a fuel control including direct response to turbine inlet temperature is disclosed in application Serial No. 496,094, filed March 23, 1955 (Patent 2,938,340). Gas turbine fuel controls also nearly always include an overspeed governor to limit turbine speed to a safe value.

Thus, with the previously known and used fuel controls of which we are aware, the engine is effectively protected against overtemperature and overspeed. The controls include mechanisms which control the engine during start, acceleration and deceleration to prevent flameout or compressor surge. The principal deficiency of controls such as those referred to lies in the fact that they do not limit the power output of the engine, nor effectively conrol the power output. The essential mode of control is to maintain the engine temperature at a desired level, and the power output of the engine may vary quite widely at any given turbine temperature. The power output of the engine depends not only upon the turbine temperature but very considerably upon the altitude pressure, the temperature of the ambient air, and the forward speed of the aircraft. For a given turbine inlet temperature, as ambient pressure increases, as forward speed of the aircraft increases raising the ram pressue in the engine inlet, and as ambient tempeature decreases, the power output will increase. Thus, an engine which is designed to deliver, for example, 4,000 H.P. under standard conditions at a normal flight altitude of 25,000 feet may be capable of delivering some 6,000 H.P. at full speed forward flight at sea level with an ambient temperature of minus 65 degrees F. It is not desirable to provide structural strength in the reduction gearing and other parts of the engine to handle this possible 6,000 H.P. output. Such excessive power output might also be beyond the safe limits of the aircraft. This situation has previously been handled by providing an engine torque or power output indicator, and relying upon the pilot to throttle back the engine if power exceeded the desired maximum.

The purpose of our invention is to provide a simple, effective and safe means to limit automatically the power output of the engine to the desired maximum whenever the ambient conditions and flight situation are such that excessive power might be delivered by the engine.

In its preferred embodiment, the invention is based primarily upon the fact that the power output of the engine is approximately a direct function of the fuel supplied to the engine. Put another way, the specific fuel consumption of the engine does not vary widely, so the power output for a given rate of fuel supply does not vary widely. Therefore, the engine delivers the maximum power if it is supplied an amount of fuel which is variable, but only to a limited extent.

In view of this, it is possible to limit the power output to a close approximation to the desired maximum by limiting the fuel flow to a predetermined maximum. This fact provides the basis for the invention. The invention, however, also embodies means directly responsive to the torque output of the engine to trim or adjust the maximum fuel flow to hold the engine accurately at the power limit. A great advantage of our power limit control is that, if the trimming control directly desponsive to torque fails, the flow-limiting device will still limit the torque approximately to the desired maximum.

The nature of the invention and the advantages thereof will be more clearly apparent to those skilled in the art from the succeeding detailed description of the preferred embodiment of the invention and the accompanying drawing, which is a schematic diagram of an engine and control system embodying the invention.

Referring first to the drawing, the turboprop power plant illustrated schematically comprises a gas turbine engine E having a power output shaft S coupled through reduction gearing G to a speed-governing propeller P. Fuel is supplied to the engine from a suitable source and line 10 by a pump 11 driven by the engine through gearing 12, 13. The fuel flows from the pump through a line 14 to a main fuel control 16, the power (that is, essentially turbine temperature) setting of which may be varied by the aircraft pilot through a control lever 17 and linkage 18. The main fuel control receives an input of engine speed through shaft 19, an input of engine inlet temperature from a temperature bulb 20 and connecting line 21, an input of engine inlet ram air pressure from a probe 23 through a line 24, and an input of turbine inlet temperature from thermocouples 26 connected to the fuel control through lines 27 and 28.

By mechanism immaterial to the present invention, the main fuel control determines a fuel supply to the engine on the basis of the inputs of engine speed, inlet temperature and pressure, and turbine inlet temperature. The amount of fuel delivered by the control is adapted to maintain a desired turbine inlet temperature as set by the control lever 17. The excess of fuel delivered by the pump is returned to the pump inlet through a bypass 31. The metered fuel delivered from the fuel control to the engine is discharged through a line 32, and, after passing through the power limiting fuel control of this invention, flows into the combustion section of the engine through a line 33 connected to fuel nozzles 34.

It will be understood that the engine and fuel control mechanism so far described are previously known, and that this invention is directed to the combination therewith of the fuel limiting control to be described.

The fuel limiting control also utilizes a power or torque measuring apparatus which may be of any type, but, as illustrated, embodies a torque meter system of the type disclosed in U.S. Patent No. 2,766,617. It is illustrated only schematically herein. The torque meter includes a toothed wheel 41 on the engine output shaft S and a toothed wheel 42 on a shaft 43 rigidly connected to the engine shaft. The torque exerted by the engine twists shaft S and thus creates a phase displacement between the teeth of wheels 41 and 42. Wheels 41 and 42 are armatures of induction generators and induce alternating current in pickup coils 44 and 46 connected to a phase detector 47. The phase detector is an electronic device which develops a current proportional to the torque of shaft S. For the purposes of the control of this invention, the current generated by the phase detector actuates a torque servo, which may be of known type, which rotates a shaft 49 proportionally to the current developed by the phase detector 47 and thus proportionally to the torque. The manner in which this measurement of torque is employed will be described subsequently.

The metered fuel line 32 from the main fuel control is connected to the engine fuel line 33 through a venturi 51. The pressure loss in the throat of the venturi is a measure of the rate of fuel flow and is employed to operate a bypass valve 52 which limits the fuel flow to the engine. Valve 52 comprises a plunger or poppet 53 normally engaging a seat 54. A branch line 56 from the metered fuel line 32 leads to the seat 54 and the valve chamber 57 is connected through bypass line 58 to the fuel return line 31. Plunger 53 is slidably mounted in a guide 59 and is connected to a diaphragm 61 forming the wall between control chambers 62 and 63. Chamber 62 is connected by pressure line 64 to the line 32 ahead of the venturi and chamber 63 is connected by pressure line 66 to the throat of the venturi. The pressure drop in the venturi throat, which is proportional to the square of flow, thus tends to lift the valve plunger 53 from its seat to bypass some part of the metered fuel to the pump inlet. Plunger 53 is biased toward closed position by a push rod 67 biased by a spring 68 which engages a movable abutment constituted by a piston 69 reciprocably mounted in the cylinder 71 within which the spring 68 is mounted. Piston 69 has a limited range of travel between a first stop provided by a snap ring 72 in the cylinder wall and a second stop defined by a set screw 73 in the end of the cylinder.

As will be apparent, spring 68 tends to hold valve 52 closed in opposition to the opening force developed on diaphragm 61 by flow through the venturi. The force of spring 68 is determined by the position of piston 69. This force is variable over a rather narrow range so that there is a rather narrow range of the critical value of fuel flow at which the pressure differential on the diaphragm will open valve 52. If the flow rises above the critical value, valve 53 will open sufficiently to bypass enough fuel into line 58 to reduce the flow to the engine to the value at which the force of spring 68 balances the flow induced pressure differential on diaphragm 61.

The position of piston 69 is controlled by the torque servo 48. The output shaft 49 of this servo drives movable contact 76 of potentiometer 77 through gearing 78. The position of the movable contact is thus directly responsive to the actual torque delivered by the engine. Potentiometer 77 and a second potentiometer 79 are connected in a parallel circuit between a current source 81 and ground. The movable contact 76 is connected by line 82 to a motor control amplifier 83. This amplifier also receives a voltage input from manually settable slider 84 of potentiometer 79 through line 86. The amplifier provides an output which is responsive to the difference of potential of the wires 82 and 86. Slider 84 may be set to pick off a voltage corresponding to the desired maximum torque. Slider 76 picks off a voltage corresponding to the actual torque. The amplifier output is supplied through lines 87 and 88 to a torque motor 89 of known type, the movable armature 91 of which is connected by a link 92 to a rocker arm 93 the other end of which mounts the movable servo valve member 94. This valve member 94, as its position varies, varies the effective restriction of the outlet 96 from the servo chamber 97 in cylinder 71. Chamber 97 is supplied with actuating fluid under pressure from any suitable source, which may be the outlet of pump 11. As illustrated, a servo supply line 98 runs from the pump outlet 14 through a pressure regulating valve 99 and line 100, which has a restriction 101 in it, into chamber 97. The pressure in chamber 97 is a function of the relative restrictions of flow by restriction 101 and movable valve member 94.

As long as torque is below the preset limit value, the torque motor closes outlet 96 and piston 69 is held against stop 72 by the fluid pressure. If the torque output reaches the limit value, the torque motor opens outlet 96, reducing the pressure in chamber 97, and the piston 69 moves toward the right, reducing the force of spring 68. At some point in the travel of the piston, the spring force will be sufficiently reduced to permit the diaphragm 61 to open valve 53, thus bypassing fuel and reducing the engine torque output. The travel of piston 69 is sufficient that the lowest flow value which can cause the engine to reach the torque limit will be capable of opening valve 52 when the piston 69 reaches stop 73. The stop is adjustable for this purpose. A conduit 103 provides an outlet from valve 94 and a drain for the cylinder to the bypass line.

In order to stabilize the control of valve 52 by the torque meter, a feedback to amplifier 83 is provided. This is effected by a potentiometer 106 having a slider 107 mechanically coupled to the plunger 67 by any suitable connection indicated by the broken line 108. The potentiometer 106 is connected to ground at one end and to the amplifier 83 by a line 109. The slider is connected to the amplifier by a line 111. Movement of the plunger thus varies the potential across lines 109 and 111, providing a feedback to the amplifier which may be employed in known manner to stabilize the operation of the torque control of the bypass valve 52.

The operation of the control may be illustrated by an example: Let us suppose that the engine is to be limited to 4,000 H.P. and that it is capable of generating 6,000 H.P. at full speed, low altitude flight on a very cold day. We may also assume that 4,000 H.P. will be developed at a fuel rate of 1,600 to 2,000 lbs. per hour, depending upon ambient and flight conditions and the condition of the engine; that 4,000 H.P. will always be generated if the fuel consumption is over 2,000 lbs. per hour and cannot be generated if the fuel consumption is less than 1,600 lbs. per hour. Also, it is preferable to permit some overload rather than to risk cutting power much below the maximum limit. We may assume that 1,800 lbs. per hour will always generate at least 3,600 H.P. and will not generate over about 4,400 H.P. The bypass valve begins to open at a flow of 1,800 lbs. per hour when the piston 69 is against stop 73 and will open sufficiently to bypass a third of the fuel delivered by the main fuel control when the flow reaches 2,000 lbs. per hour and the piston is against stop 72.

If the plane is flying at full power setting at high altitudes, the fuel consumption will be low. If we assume that the plane descends at full power or possibly encounters a cold front at moderate altitudes, the main fuel control will deliver more fuel than 2,000 lbs. per hour, since the engine will accept this without excessive turbine temperature. As long as the torque is below that corresponding to 4,000 H.P. the piston will be against stop 72, putting the maximum loading on the valve 52. If the fuel flow reaches 2,000 lbs. per hour, the bypass valve will begin to open. However, normally the torque will reach the limit value before the fuel flow reaches 2,000 lbs. per hour and, as soon as it does, the servo system will open valve 94 to allow piston 69 to move to the right. It will continue to move to the right as long as the torque is excessive until the loading of spring 68 is reduced to the point at which valve 62 will open to bypass fuel and hold the torque to the 4,000 H.P. level.

This leads to discussion of an important advantage of the invention. If the torque meter and the servo system, including the amplifier and valve 94 work properly, the torque is held to the exact desired limit, because spring 68 can be loaded to obtain this result over the entire range of specific fuel consumption at 4,000 H.P. However, even if these fail, the fuel will be limited to a maximum value of from 1,800 to 2,000 lbs. per hour, depending upon the position of piston 69. Thus, under the most unfavorable conditions of failure of the servo system and specific fuel consumption, the torque limiter cannot reduce the fuel to less than 90% of that corresponding to the limiting torque value and will never let fuel flow to the engine go to more than 110% of that developing the maximum torque limit. Thus, there is a very simple control involving only the venturi, the diaphragm, the bypass valve, and the spring which will, under any circumstances, limit power at some point reasonably close to the desired limit. If the electronically controlled servo system is operating properly, the exact limit will be maintained. If the electronic system were relied upon entirely and the force of spring 68 were not limited by the stops 72 and 73, failure of the servo system might result in bypassing a third of the fuel supplied to the engine. Such an occurrence on takeoff, for example, might be disastrous.

It will be noted that the foregoing discussion has referred to torque and power as directly related values, which they are in a system of this sort if the propeller is driven at constant speed. However, the control, as described and as preferred, responds to torque. Even if the propeller speed varies to some extent, the torque is the best measure of overload on the reduction gear and other mechanisms.

The detailed description of the preferred embodiment of the invention for the purpose of explaining the principles thereof is not to be considered as limiting the invention, as many modifications may be made within the scope of the invention by the exercise of skill in the art.

We claim:

1. The combination of a gas turbine engine having a power output shaft and having the characteristic that a predetermined torque output is developed by the engine in a normal operating regime thereof in consequence of fuel flow to the engine approximating a predetermined value, means for supplying fuel to the engine including a main fuel control regulating the fuel supply to the engine and normally determining the power output thereof, a fuel line connecting the main fuel control to the engine conducting all the fuel to the engine, a flowmeter in the fuel line, and means controlled by the flowmeter connected to the fuel line for limiting fuel flow to the engine to the said predetermined value.

2. The combination of a gas turbine engine having a power output shaft and having the characteristic that a predetermined torque output is developed by the engine in a normal operating regime thereof in consequence of fuel flow to the engine approximating a predetermined value, means for supplying fuel to the engine including a main fuel control regulating the fuel supply to the engine and normally determining the power output thereof, a fuel line connecting the main fuel control to the engine conducting all the fuel to the engine, a flowmeter in the fuel line, and means including a bypass from the fuel line upstream of the flowmeter and a valve in the bypass controlled by the flowmeter for limiting fuel flow to the engine to the said predetermined value.

3. A control system for a gas turbine engine having a power output shaft and having the characteristic that a predetermined torque output is developed by the engine in a normal operating regime thereof in consequence of fuel flow to the engine approximating a predetermined value, the system comprising, in combination, means for supplying fuel to the engine including a main fuel control regulating the fuel supply to the engine and normally determining the power output thereof, a fuel line connecting the main fuel control to the engine conducting all of the fuel to the engine, a flowmeter in the fuel line, means including a bypass from the fuel line upstream of the flowmeter and a valve in the bypass controlled by the flowmeter for limiting fuel flow to the engine to the said predetermined value, means responsive to the torque output of the engine, and means controlled by the torque-responsive means connected to the valve to adjust the valve position so as to modify fuel flow to the engine to the value effective to generate the said predetermined torque output.

4. A fuel control system for a gas turbine engine having the characteristic that a predetermined maximum torque is developed by the engine in a normal operating regime thereof in consequence of fuel flow to the engine within a predetermined range of values, the system comprising, in combination, means for supplying fuel, a main fuel control for metering the fuel and normally determining the power output of the engine, a fuel line connecting the main fuel control to the engine, a venturi in the fuel line, a bypass conduit from the fuel line ahead of the venturi, a valve in the bypass conduit, means responsive to pressure drop in the venturi biasing the valve toward open position, and a spring biasing the valve toward closed position, the spring being sufficient to hold the valve closed until the fuel flow reaches a value within the said predetermined range.

5. A fuel control system for a gas turbine engine having the characteristic that a predetermined maximum torque is developed by the engine in a normal operating regime thereof in consequency of fuel flow to the engine within a predetermined range of values, the system comprising, in combination, means for supplying fuel, a main fuel control for metering the fuel, a fuel line connecting the main fuel control to the engine, a venturi in the fuel line, a bypass conduit from the fuel line ahead of the venturi, a valve in the bypass conduit, means responsive to pressure drop in the venturi biasing the valve toward open position, a spring biasing the valve toward closed position, an abutment engaged by the spring movable between limits providing a spring loading range corresponding to the said predetermined range of fuel flows within which the predetermined maximum torque of the engine is developed, and means responsive to torque output of the engine coupled to the abutment so as to vary the loading of the spring in such sense as to limit torque output to a predetermined value.

6. A fuel control system for a gas turbine engine having the characteristic that a predetermined maximum torque is developed by the engine in a normal operating regime thereof in consequence of fuel flow to the engine within a predetermined range of values, the system comprising, in combination, means for supplying fuel, a main fuel control for metering the fuel, a fuel line connecting the main fuel control to the engine, a venturi in the fuel line, a bypass conduit from the fuel line ahead of the venturi, a valve in the bypass conduit, means responsive to pressure drop in the venturi biasing the valve toward open position, a spring biasing the valve toward closed position, an abutment engaged by the spring movable between limits, the limits of movement of the abutment providing a spring loading range effective to cause opening of the valve within the range of venturi pressure drop resulting from fuel flows within the said predetermined range of values, means responsive to the torque output of the engine, and means controlled by the torque-responsive means connected to the abutment to move the abutment so as to modify fuel flow to the engine to the value effective to generate the said predetermined maximum torque output.

7. A fuel control system for a gas turbine engine having the characteristic that a predetermined maximum torque is developed by the engine in a normal operating regime thereof in consequence of fuel flow to the engine within a predetermined range of values, the system comprising, in combination, means for supplying fuel, a main fuel control for metering the fuel, a fuel line connecting the main fuel control to the engine, a venturi in the fuel line, a bypass conduit from the fuel line ahead of the venturi, a valve in the bypass conduit, means responsive to pressure drop in the venturi biasing the valve toward open position, a spring biasing the valve toward closed position, and an abutment engaged by the spring movable between limits, the limits of movement of the abutment providing a spring loading range effective to cause opening of the valve within the range of venturi pressure drop resulting from fuel flows within the said predetermined range of values.

8. The combination of a gas turbine engine having a power output shaft, and having the characteristic that a predetermined torque output is developed by the engine in a normal operating regime thereof in consequence of fuel flow to the engine approximating a predetermined value, means for supplying fuel to the engine including a main fuel control regulating the fuel supply to the engine and normally determining the power output thereof, a fuel line connecting the main fuel control to the engine conducting all the fuel to the engine, a flowmeter in the fuel line, means including a valve controlled by the flowmeter connected to the fuel line for limiting fuel flow to the engine to the said predetermined value, means responsive to the torque output of the engine, and means controlled by the torque-responsive means connected to the valve to adjust the valve position so as to modify fuel flow to the engine to the value effective to generate the said predetermined torque output.

References Cited in the file of this patent

UNITED STATES PATENTS

| | | |
|---|---|---|
| 2,303,998 | Holley | Dec. 1, 1942 |
| 2,404,428 | Bradbury | July 23, 1946 |
| 2,560,118 | Malone et al. | July 10, 1951 |
| 2,702,560 | Bobier | Feb. 22, 1955 |
| 2,708,826 | Torrell | May 24, 1955 |
| 2,714,803 | Abild | Aug. 9, 1955 |

FOREIGN PATENTS

| | | |
|---|---|---|
| 617,729 | Great Britain | Feb. 10, 1949 |
| 769,103 | Great Britain | Feb. 27, 1957 |